US009126805B2

(12) United States Patent
Pelto-Huikko et al.

(10) Patent No.: US 9,126,805 B2
(45) Date of Patent: Sep. 8, 2015

(54) ROPE OF AN ELEVATOR AND A METHOD FOR MANUFACTURING THE ROPE

(71) Applicant: KONE Corporation, Helsinki (FI)

(72) Inventors: Raimo Pelto-Huikko, Vantaa (FI); Petri Kere, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 13/765,269

(22) Filed: Feb. 12, 2013

(65) Prior Publication Data

US 2013/0206516 A1    Aug. 15, 2013

(30) Foreign Application Priority Data

Feb. 13, 2012    (FI) .................................... 20125151

(51) Int. Cl.
*B66B 7/00* (2006.01)
*B66B 5/00* (2006.01)
(Continued)

(52) U.S. Cl.
CPC ................ *B66B 7/062* (2013.01); *B29D 99/00* (2013.01); *B66B 5/0025* (2013.01); *B66B 7/1238* (2013.01); *B66B 9/00* (2013.01);
(Continued)

(58) Field of Classification Search
CPC ...... B66B 7/062; B66B 11/008; B66B 23/10; B66B 7/1238; B66B 7/1223; D07B 1/22; D07B 1/162; D07B 2201/2087; D07B 2201/1004; F16G 1/28; F16G 1/16; F16G 9/00; F16G 9/02; F16G 9/04
USPC .......... 187/251, 254, 255, 391; 474/263, 265, 474/268, 272
See application file for complete search history.

(56) References Cited

U.S. PATENT DOCUMENTS 3,643,518 A * 2/1972 Semin et al. ................... 474/139
4,981,462 A * 1/1991 White, Jr. et al. .............. 474/238
(Continued)

FOREIGN PATENT DOCUMENTS

DE    102008037541 A1 * 10/2009 ................ B66B 7/06
DE    10 2009 006 063 A1    7/2010
(Continued)

OTHER PUBLICATIONS

WIPO, Machine Translation, WO 2010072690 A1, Feb. 8, 2014, pp. 3-13.*
(Continued)

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

A rope of a lifting device, more particularly of a passenger transport elevator and/or freight transport elevator, an elevator, and a method for manufacturing the rope are disclosed. The rope includes an unbroken load-bearing part, the profile of which is essentially of rectangular shape, and the width of the cross-section is greater than the thickness and which load-bearing part comprises glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material. The long sides of the cross-section of the load-bearing part include one or more grooves symmetrically or asymmetrically in the longitudinal direction of the rope, which grooves divide the load-bearing part into smaller parts.

22 Claims, 2 Drawing Sheets

(51) Int. Cl.
*B66B 11/08* (2006.01)
*F16G 9/04* (2006.01)
*F16G 1/22* (2006.01)
*B29D 29/00* (2006.01)
*B66B 7/06* (2006.01)
*B29D 99/00* (2010.01)
*B66B 9/00* (2006.01)
*B66B 7/12* (2006.01)

(52) U.S. Cl.
CPC .......... *D07B2501/2007* (2013.01); *F16G 9/04* (2013.01); *Y10T 428/24537* (2015.01)

(56) References Cited

U.S. PATENT DOCUMENTS

| | | | |
|---|---|---|---|
| 5,458,710 A * | 10/1995 | White, Jr. et al. | 156/138 |
| 5,518,460 A * | 5/1996 | White, Jr. et al. | 474/139 |
| 6,419,605 B1 * | 7/2002 | Takahashi et al. | 474/237 |
| 6,893,719 B1 * | 5/2005 | Nakajima et al. | 428/375 |
| 2001/0014996 A1 | 8/2001 | Ericson et al. | |
| 2003/0121729 A1 * | 7/2003 | Heinz et al. | 187/254 |
| 2004/0110441 A1 | 6/2004 | Parrini | |
| 2004/0262087 A1 * | 12/2004 | Ach | 187/264 |
| 2005/0226584 A1 | 10/2005 | Williams et al. | |
| 2005/0285059 A1 | 12/2005 | Gerber et al. | |
| 2006/0018586 A1 | 1/2006 | Kishida | |
| 2008/0067009 A1 * | 3/2008 | Ach | 187/250 |
| 2008/0149430 A1 * | 6/2008 | De Angelis | 187/251 |
| 2009/0268198 A1 | 10/2009 | Brendel | |
| 2010/0243378 A1 * | 9/2010 | Begle | 187/254 |
| 2011/0000746 A1 | 1/2011 | Pelto-Huikko et al. | |
| 2011/0088981 A1 * | 4/2011 | Urbani et al. | 187/251 |
| 2011/0192683 A1 * | 8/2011 | Weinberger et al. | 187/254 |
| 2011/0240408 A1 * | 10/2011 | Wesson et al. | 187/251 |
| 2012/0195733 A1 | 8/2012 | Bruch et al. | |

FOREIGN PATENT DOCUMENTS

| | | | | |
|---|---|---|---|---|
| EP | 1334943 A1 | | 8/2003 | |
| EP | 1396458 A2 * | | 3/2004 | B66B 11/08 |
| EP | 2154097 A1 * | | 2/2010 | B66B 7/06 |
| EP | 2203373 A2 * | | 7/2010 | B66B 7/06 |
| EP | 2 356 054 | | 8/2011 | |
| FI | 122261 B | | 11/2011 | |
| GB | 2458001 A * | | 9/2009 | D07B 1/22 |
| JP | 55-104015 A | | 8/1980 | |
| JP | 55-156177 A | | 12/1980 | |
| JP | 2001-302135 A | | 10/2001 | |
| JP | 2002-505240 A | | 2/2002 | |
| JP | 2004-284821 A | | 10/2004 | |
| JP | 2010-102851 A | | 5/2010 | |
| JP | 2011-509899 A | | 3/2011 | |
| JP | 2011-116567 A | | 6/2011 | |
| JP | 2012-515126 A | | 7/2012 | |
| WO | WO 99/43885 A1 | | 9/1999 | |
| WO | WO 02/10050 A1 | | 2/2002 | |
| WO | WO 2009/090299 A1 | | 7/2009 | |
| WO | WO 2010/056247 A1 | | 5/2010 | |
| WO | WO 2010072690 A1 * | | 7/2010 | B66B 7/06 |
| WO | WO 2011/029726 A2 | | 3/2011 | |
| WO | WO 2011/004071 A2 | | 7/2011 | |
| WO | WO 2013/110853 A1 | | 8/2013 | |

OTHER PUBLICATIONS

EPO, Machine Translation, EP 1396458 A2, Jun. 6, 2012, pp. 1-3.*

* cited by examiner

ROPE OF AN ELEVATOR AND A METHOD FOR MANUFACTURING THE ROPE

FIELD OF THE INVENTION

The object of the present invention is a rope of a lifting device, an elevator and a method for manufacturing the rope.

BACKGROUND OF THE INVENTION

It is advantageous to manufacture the ropes of lifting devices, more particularly the hoisting ropes and suspension ropes of passenger transport elevators and freight transport elevators, including the compensating ropes and overspeed governor ropes of an elevator, to be of a composite structure. If the ropes of an elevator are formed to be such that their longitudinal load-bearing capability is based on non-metallic material, more particularly on non-metallic reinforcing fibers, the ropes can be made lightweight and as a result of the lightweightness of the roping the energy efficiency of the elevator will improve.

An elevator suspension rope having load-bearing composite parts is presented e.g. in patent publication WO 2009090299. By forming the rope to be composite-structured and belt-type, considerable savings can be achieved even though the inexpensive metal material conventionally used in the ropes of an elevator conventionally is replaced with more expensive material. Additionally, e.g. when the rope passes around at least one rope pulley comprised in the suspension arrangement, it is advantageous to fabricate the width of the rope to be larger than the thickness. One advantage, among others, is that the bending radius of the rope can be reduced without losing bearing surface area. As a consequence, the rope can be manufactured from rigid material, the elongation properties of which would otherwise prevent an advantageous bending radius. The rope can thus also be formed to comprise a larger cross-sectional area than before, via which the speed of the rope can be acted on, e.g. for braking the rope. In this way the rope can be acted on more reliably than before without damaging the non-metallic parts of the rope.

One problem in composite-structured elevator ropes has been their manufacturing technology. Lightweight, belt-type ropes preferably comprise a plurality of composite-structured load-bearing parts for transmitting force in the longitudinal direction of the rope. The longitudinal load-bearing parts of the rope have been manufactured separately and bound together with a polymer layer, which surrounds the force-transmitting parts. The rope has thus been manufactured in a number of phases and a polymer layer has had to be made on the surface of a number of parts, which increases costs and impairs productivity. In addition, the load-bearing parts of the rope have had to be stored on a number of reels, which hampers the manufacturing process and further increases costs.

BRIEF SUMMARY OF THE INVENTION

The aim of the invention is to eliminate the aforementioned drawbacks of prior-art solutions. The aim of the invention is to improve the structure and manufacturing technology of composite-structured ropes of a lifting device, more particularly of a passenger transport elevator and/or freight transport elevator.

The aim of the invention is to achieve one or more of the following advantages, among others:

A rope and an elevator are achieved, the mass of the parts that move along with the car of which is lower than before.

A rope and a method for manufacturing the rope are achieved, with which method a safe elevator rope of uniform quality and an elevator having safe reeving are achieved.

A rope and a method for manufacturing the rope are achieved, which method is cost-effective and productivity is better than before.

A rope and a method for manufacturing the rope are achieved, with which method the load-bearing part of the rope can be manufactured in a single pass quickly and economically.

A rope and a method for manufacturing the rope are achieved, which method facilitates the storing and transportation of the rope automatically on one reel, which facilitates handling of the rope and reduces costs.

A rope and a method for manufacturing the rope are achieved, which method facilitates the coating process of the rope and improves uniformity of quality in the coating of the rope.

A rope and a method for manufacturing the rope are achieved, with which method sensors for condition monitoring can be integrated into the rope in the manufacturing phase.

The invention is based on the concept that a rope of a lifting device comprises a load-bearing part, the profile of which is essentially of rectangular shape, and the width of the cross-section is greater than the thickness and which load-bearing part comprises glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material, and that one or more grooves are made symmetrically or asymmetrically in the longitudinal direction of the rope on a long side or on the long sides of the cross-section of the load-bearing part, which grooves divide the one piece of the load-bearing part into smaller parts, preferably into two or more, more preferably into three or more, most preferably into four or more parts. In this way the mechanical properties of the load-bearing part and of the rope can be optimized without loss in the cross-sectional area of the load-bearing part and the structure becomes strong in the longitudinal direction.

Using the method according to the invention the load-bearing part of the rope of a lifting device can be fabricated as a single piece, preferably e.g. using pultrusion technology, in a single pass, in which case a manufacturing tool makes longitudinal grooves in the load-bearing part. According to the invention the polymer coating is made on the surface of only one part, in which case the productivity of the manufacturing line improves. The friction properties of a rope with a polymer coating become better and the rope becomes durable against wear.

Pultrusion technology is a continuous production method, with which glass-fiber reinforced, aramid-fiber reinforced or carbon-fiber reinforced profiles are manufactured, as is known in the art. In the pultrusion process the product is pulled through a tool in long strips. Thus the manufacturing method guarantees excellent tensile strength for the load-bearing flat profile of the rope.

Preferably the load-bearing part of one rope is stored and transported on one reel, which facilitates handling and reduces costs.

Preferably the width/thickness ratio of the load-bearing part of the rope is at least 2 or more, preferably at least 4, or even 5 or more, or even 6 or more, or even 7 or more, or even 8 or more. In this way good load-bearing capability is achieved with a small bending radius. This can be implemented preferably with the fiber-reinforced composite material presented in this patent application, which material has an advantageously large width/thickness ratio owing to the rigidity of the structure.

Preferably the width of the cross-section of the parts separated by the longitudinal grooves of the load-bearing part is greater than the thickness, preferably such that the width/thickness ratio of each aforementioned part is at least 1.3 or more, or even 2 or more, or even 3 or more, or even 4 or more, or even 5 or more. In this way a wide rope can be formed simply and to be thin.

Preferably when loaded the load-bearing part splits at the point of the grooves in a controlled manner into a number of separate load-bearing parts, into parts of essentially equal size. The polymer coating, preferably elastomer coating, e.g. polyurethane coating, around the rope keeps the belt-type rope together, in which case the cross-section of the load-bearing part remains essentially the same and, that being the case, the longitudinal strength and rigidity of the rope is not lost.

Preferably inside the polymer coating is a fabric, e.g. a fabric reinforcement woven on a braiding machine, which fabric ensures that the coating remains intact after cracking of the load-bearing part. In this way the structure becomes more durable than before.

Preferably the load-bearing part can also be fully or partly braided with reinforcements, in which case individual reinforcing-fiber bundles cross over and under each other. In this way the load-bearing parts can bind to each other with the reinforcements and after cracking the load-bearing parts will remain in their position. In this way a structure is achieved for the rope, in which the braidings absorb energy well and also prevent propagation of a crack.

Preferably the load-bearing part of the rope comprises glass-fiber reinforcements, more preferably aramid-fiber reinforcements or carbon-fiber reinforcements. Thus the specific stiffness and specific strength of the reinforcements are better than metal fibers.

Preferably the load-bearing part of the rope comprises polymer fiber reinforcements, e.g. polybenzoxazole fiber reinforcements, or polyethylene fiber reinforcements, such as UHMWPE fiber reinforcements, or nylon fiber reinforcements. Thus all the reinforcements are more lightweight than metal fibers.

In one embodiment the load-bearing part of the rope comprises different reinforcements, preferably e.g. carbon fiber reinforcements and polybenzoxazole fiber reinforcements, in the same structure of the load-bearing part. Thus the load-bearing part of the rope can be optimized to be that desired in terms of its mechanical properties and costs.

Preferably one or more optical fibers and/or fiber bundles are arranged in connection with manufacture inside or on the surface of the load-bearing part for arranging monitoring of the condition of the rope or for data transfer.

Preferably the proportion by volume of the reinforcements of the aforementioned load-bearing part of the rope is at least 60 percent by volume reinforcing fibers in the load-bearing part. In this way the longitudinal mechanical properties of the load-bearing part are adequate.

Preferably the proportion of the reinforcements of the aforementioned load-bearing part of the rope is at least 60 percent by weight reinforcing fibers in the load-bearing part. In this way the longitudinal mechanical properties of the load-bearing part are adequate.

Preferably at least 65 percent of the surface area of the cross-section of the aforementioned load-bearing part of the rope is reinforcing fibers. In this way the longitudinal mechanical properties of the load-bearing part are adequate.

Preferably the aforementioned load-bearing part of the rope covers over 50 percent of the surface area of the cross-section of the rope, preferably 55 percent or over, even more preferably 60 percent or over, even more preferably 65 percent or over. In this way a large part of the cross-sectional area of the rope is load-bearing.

In one embodiment the load-bearing part of the rope comprises inside it and/or on its surface one or more optical fibers, most preferably of all a fiber bundle or fiber coil, which is disposed essentially inside and/or in the proximity of the surface of the load-bearing part in question as viewed in the thickness direction of the rope.

Preferably the optical fibers to be used for condition monitoring of the rope and for measuring purposes comprise a number of optical fibers needed for measurements and also, in addition to them, fibers to be used for data transfer.

Preferably over 60 percent of the surface area of the cross-section of the load-bearing part of the rope is the aforementioned reinforcing fiber and optical fiber, preferably such that 45-85 percent is the aforementioned reinforcing fiber and optical fiber, more preferably such that 60-75 percent is the aforementioned reinforcing fiber and optical fiber, most preferably such that approx. 59 percent of the surface area is the reinforcing fiber and at most approx. 1 percent is optical fiber and approx. 40 percent is matrix material.

In one embodiment an optical fiber, which functions as an optical Fabry-Pérot-type sensor, is integrated into the load-bearing part of the rope.

In one embodiment a single-piece optical fiber, comprising Bragg gratings is integrated into the load-bearing part of the rope, i.e. the so-called Fiber Bragg Grating FBG method is applied in the condition monitoring of the rope.

In one embodiment an optical fiber, which is used as a sensor functioning on the Time-Of-Flight principle, is integrated into the load-bearing part of the rope.

In one embodiment an optical fiber, which is used as a sensor based on Brillouin spectrum measurement, is integrated into the load-bearing part of the rope.

In one embodiment the load-bearing part of the rope comprises inside it and/or on its surface one or more optical fibers, most preferably of all a fiber bundle or fiber coil, which is disposed essentially inside and/or in the proximity of the surface of the parts of the profile divided by the longitudinal grooves of the load-bearing part of the rope in question as viewed in the thickness direction of the rope.

Preferably the tensile strengths and/or the moduluses of elasticity of the parts of the profile divided by the longitudinal grooves of the load-bearing part of the rope are dimensioned to be essentially the same.

Preferably the surface areas of the cross-sections of the parts of the profile divided by the longitudinal grooves of the load-bearing part of the rope are essentially the same.

Preferably the parts of the profile divided by the longitudinal grooves of the load-bearing part are visible outside the rope, owing to the transparency of the matrix material binding the load-bearing parts to each other.

Preferably the optical fibers and/or fiber bundles comprised in the load-bearing part of the rope are essentially translucent to LED or laser light. Thus the condition of the load-bearing part can be monitored by monitoring changes in one of its optical properties.

Preferably the specific strength of the reinforcing fibers of the load-bearing part of the rope in tension is over 500 (MPa/ g/cm³). One advantage is that the fibers are lightweight, and not many of them are needed because they are strong.

Preferably the load-bearing part of the rope is an unbroken elongated rod-like piece.

Preferably the load-bearing part of the rope is essentially parallel with the longitudinal direction of the rope.

Preferably the structure of the load-bearing part of the rope continues essentially the same for the whole length of the rope.

Preferably the individual reinforcing fibers of the load-bearing part of the rope are homogeneously distributed into the aforementioned matrix material.

Preferably the reinforcing fibers of the load-bearing part of the rope and the one or more optical fibers and/or fiber bundles are bound into an unbroken load-bearing part with the aforementioned polymer matrix material in the manufacturing phase by disposing the reinforcing fibers and optical fibers in the polymer matrix material.

Preferably the load-bearing part of the rope is composed of straight reinforcing fibers essentially parallel with the longitudinal direction of the rope and of one or more optical fibers and/or fiber bundles, which are bound into an unbroken part with the polymer matrix material.

Preferably essentially all the reinforcing fibers of the aforementioned load-bearing part of the rope and the one or more optical fibers and/or fiber bundles are in the longitudinal direction of the rope.

Preferably the matrix material of the load-bearing part of the rope is a non-elastomer. More preferably the matrix material of the load-bearing part of the rope comprises epoxy resin, polyester resin, phenolic resin or vinyl ester.

Preferably the modulus of elasticity E of the matrix material of the load-bearing part of the rope is over 1.5 GPa, most preferably over 2 GPa, even more preferably in the range 2-10 GPa, most preferably of all in the range 2.5-4 GPa.

Preferably the load-bearing part is surrounded with a polymer layer, which is preferably an elastomer, most preferably a high-friction elastomer such as e.g. polyurethane.

Preferably the load-bearing part of the rope is composed of the aforementioned polymer matrix, of reinforcing fibers bound to each other by the polymer matrix and of one or more optical fibers and/or fiber bundles, and also possibly of a sizing around the fibers, and also possibly of additives mixed into the polymer matrix.

In one embodiment an optical fiber of the rope also functions as a long vibration sensor. In the vibration measuring apparatus, single-mode fiber or multimode fiber is used as a sensor and a solid-state laser as a light source. The detection of vibration is based on measuring the changes of a speckle diagram formed of bright and dark spots occurring at the second end (in the far field) of an optical fiber.

According to the invention the elevator comprises means for monitoring the condition of the optical fibers and/or fiber bundles of the rope, which means monitor from the load-bearing parts of the rope preferably the condition of the aforementioned one or more optical fibers and/or fiber bundles.

Preferably with the aforementioned condition-monitoring means the condition of the rope and/or roping is monitored by monitoring the condition of the parts comprising one or more optical fibers and/or fiber bundles in one of the following ways:
   by measuring changes that have occurred in the time-of-flight of a light pulse in an optical fiber,
   by detecting changes in the spectrum and/or phase and/or wavelength of reflected, deflected or scattered light,
   by detecting visually or by the aid of a photodiode the amount of light traveling through a fiber
   by comparing the values measured from different fibers and/or fiber bundles with each other and by observing the deviations between the measured values instead of the absolute values.

Some inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments of the invention can be applied within the scope of the basic inventive concept in conjunction with other embodiments.

BRIEF DESCRIPTION OF THE DRAWINGS

The invention will now be described mainly in connection with its preferred embodiments, with reference to the attached drawings, wherein.

DETAILED DESCRIPTION OF THE INVENTION

Figure 1:
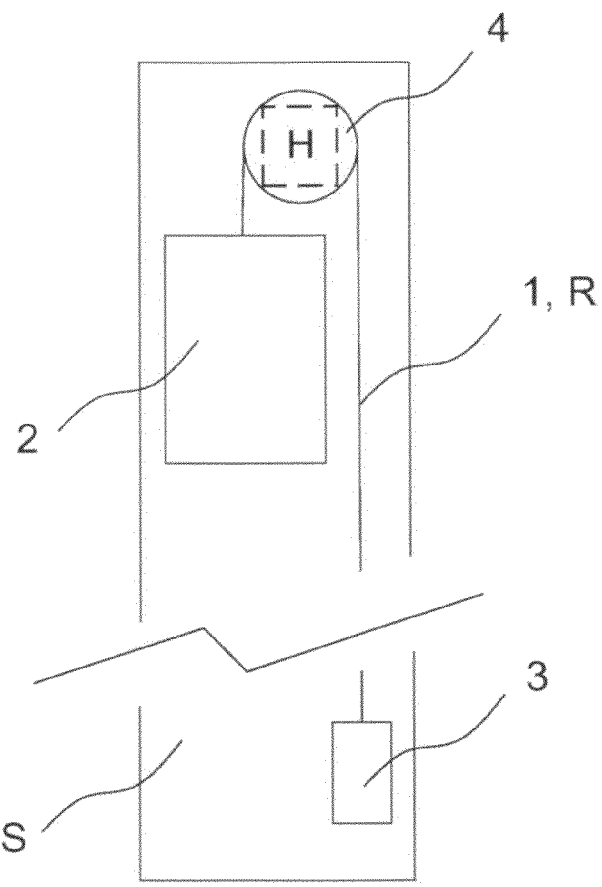
FIG. 1 presents one embodiment of an elevator according to the invention.

FIG. 1 presents one embodiment of an elevator according to the invention, which comprises an elevator car 2, a counterweight 3 and roping 1, which comprises one or more ropes R, and which connects the aforementioned elevator car 2 and the counterweight 3 to each other. The roping 1 is moved with means intended for this purpose, preferably e.g. a traction sheave 4 supported on the building, to which traction sheave a power source, such as a hoisting machine M, that rotates the traction sheave is connected. The rope R is preferably one of those presented in FIGS. 2, 3 in terms of its structure. The elevator is preferably a passenger and/or freight transport elevator, which is installed to travel in an elevator hoistway S in a building.

The means for moving intended for exerting a force on the elevator car or counterweight can also comprise hoisting roping that is separate from the suspension roping. It is not necessarily needed to connect the hoisting roping both to the elevator car and to the counterweight, but instead when the hoisting roping is connected to only one of these, by moving one of these with the hoisting roping the other is also moved, because they can be in connection with each other via the suspension roping and thus their positions are dependent on each other. This can be brought about such that the hoisting machine can via the hoisting roping exert either a downward or an upward pulling force on the counterweight, and correspondingly on the elevator car. A 1:1 suspension ratio is advantageous because, when the rope structure is composite-structured in the manner specified, making a large number of bendings is not advantageous owing to the space taken by the bendings. The suspension ratio could, however, also be some other, e.g. 2:1. The hoisting roping can be different in its cross-section and/or in its material to the suspension roping. The structure of the ropes of the hoisting roping can in this case be optimized e.g. from the viewpoint of friction, at the same time as the structure of the ropes of the suspension roping can be optimized from the viewpoint of the tensile strength and rigidity and lightweightness of the rope. The hoisting roping can comprise one or more ropes, which comprise one or more force-transmitting parts, which part is a braiding. The hoisting machine M can also be disposed in a space beside the elevator hoistway S in the proximity of the bottom end of the trajectory of the elevator car. An advantage of this type of embodiment is, inter alia, inexpensive installation costs for the machine of the elevator, accessibility of the machine in servicing situations and also a saving in actual hoistway space.

Figure 2:
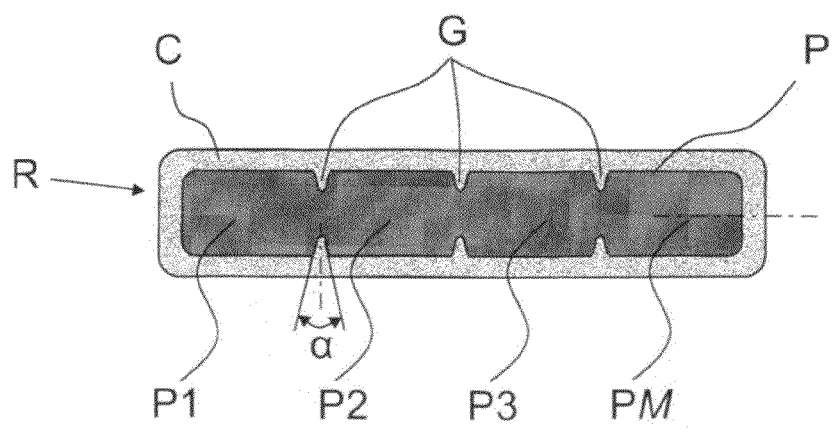
FIG. 2 presents schematically a magnified cross-section of a first embodiment of a rope according to the invention.
Figure 3:
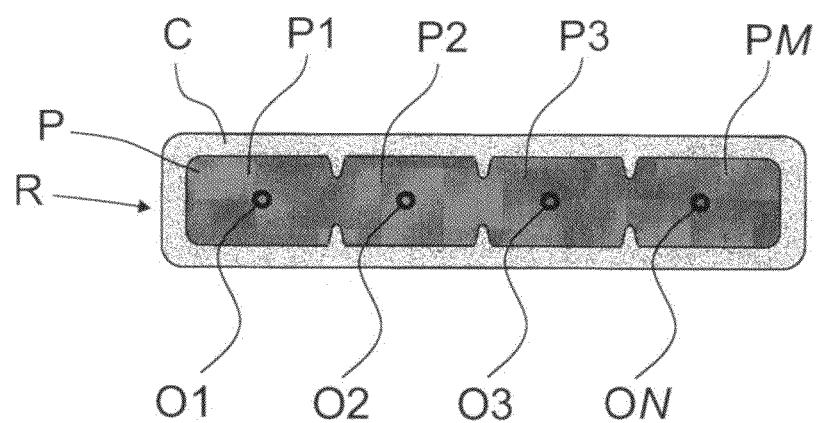
FIG. 3 presents schematically a magnified cross-section of a second embodiment of a rope according to the invention.

FIGS. 2 and 3 present cross-sections of preferred embodiments of the rope R of the hoisting roping 1 of an elevator according to the invention. As stated earlier, the hoisting roping 1 comprises one or more ropes R, which comprises a load-bearing composite part P, which comprises reinforcing fibers in a matrix material, which is preferably resin. A load-bearing composite part P means the force-transmitting part of the rope R, which is a part elongated in the longitudinal direction of the rope R for transmitting force in the longitudinal direction of the rope. This part P is able to bear a significant part of the load exerted on the rope R in question, e.g. tensile stress in the longitudinal direction of the rope R caused by moving the elevator car 2 and the counterweight 3 according to the embodiment of FIG. 1. According to the embodiment of the elevator presented in FIG. 1, the load-bearing part P of the rope R of the roping 1 continues from the elevator car 2 at least to the counterweight 3 and the rope R is arranged to transmit with the aforementioned load-bearing part P forces in the longitudinal direction of the rope between the elevator car 2 and the counterweight 3. Thus the elevator car 2 and the counterweight 3 hang supported essentially by the aforementioned load-bearing part P.

Preferably the hoisting roping 1 is connected to the elevator car 2 and to the counterweight 3 such that when the elevator car moves upwards, the counterweight moves downwards, and vice versa, and the hoisting roping travels over a rope pulley 4 that is supported in its position. The ropes 1 of the roping can also be suspended by bending around a rope pulley, which rope pulley does not need to be a driven rope pulley, in which case the bending of a rigid rope because of the machine is not great either. The rope pulley 4 is preferably, but not necessarily, slightly thicker in the center than at the sides, i.e. the rope pulley is cambered. The aforementioned camber of the rope pulley is preferably less than 1 percent of the diameter of the rope pulley. In this way a belt-type rope stays in the center of the rope pulley better during a run.

According to the invention the width of the aforementioned load-bearing part P is preferably greater than the thickness and the aforementioned load-bearing part P comprises one or more grooves G in the longitudinal direction of the rope on one or more of its wider sides. The aforementioned groove G divides the load-bearing part P into parts in the longitudinal direction of the rope, e.g. in the embodiments presented in FIGS. 2 and 3 three grooves G in both the long sides of the essentially rectangular load-bearing part P symmetrically divide the cross-section of the load-bearing part P into four parts P1, P2, P3, PM of essentially equal size, which parts are solidly the same piece. The width/thickness ratio of the load-bearing part P of the rope is preferably at least 2 or more, more preferably at least 4, or even 5 or more, or even 6 or more, or even 7 or more or even 8 or more. The width of the aforementioned parts P1, P2, P3, PM of the profile separated by the longitudinal grooves G of the rope is greater than the thickness, preferably such that the width/thickness ratio of each aforementioned part is at least 1.3 or more, or even 2 or more, or even 3 or more, or even 4 or more, or even 5 or more. For example, using pultrusion technology the depth of a groove G of a load-bearing part made with a manufacturing tool is preferably 0.5-2 mm, more preferably 1-1.5 mm, and the width is preferably 0.5-3 mm, more preferably 1-2 mm. Preferably the aforementioned groove G is V-groove shaped, the V-angle α being preferably 15-40 degrees, more preferably 25-30 degrees. Pultrusion is a continuous, highly-automated profile manufacturing method, which reaches a high production speed, preferably a production speed as high as 0.5-2 m/min, i.e. pultrusion is particularly suited to the manufacture of large series. Pultrusion products characteristically have a high reinforcement content and longitudinal alignment of the reinforcements. Owing to this, the axial mechanical properties are also high. The reinforcements are typically roving-type reinforcements.

In this way a wide rope can be formed simply and to be thin and a belt-type rope also shapes out well on top of the cambering of the rope pulley and during a run stays in the center of the rope pulley. According to the invention a load-bearing composite part P composed of a single piece comprises around it a coating C, which is preferably elastomer, most preferably polyurethane that improves the friction properties and resistance to wear.

The aforementioned load-bearing part P according to the embodiments of FIGS. 2 and 3 when loaded settles tightly onto the cambered rope pulley, shaping itself around the longitudinal direction of the rope. The belt-type rope bends in tension around the longitudinal axis of the rope at the point of the grooves G. Preferably the load-bearing part P splits under tension at the point of the grooves G in a controlled manner into a number of separate load-bearing parts, according to the embodiment of FIGS. 2 and 3 into parts P1, P2, P3, PM, of essentially equal size. The elastomer coating, preferably polyurethane coating C, around the rope keeps the belt-type rope together, in which case the aggregated cross-sectional area of the load-bearing parts remains essentially the same and, that being the case, the longitudinal strength and rigidity of the rope is not lost. In a rope there can be one or more grooves G in the longitudinal direction of the rope such that the number of grooves is optimized according to the purpose for which the rope is used. The rope can also be used on a rope pulley without camber.

According to one embodiment of the invention, presented in FIG. 3, the rope R comprises a load-bearing part P, which is preferably a glass fiber reinforced and/or aramid fiber reinforced and/or carbon fiber reinforced and/or polybenzoxazole fiber reinforced and/or polyethylene fiber reinforced and/or nylon fiber reinforced plastic composite, which comprises glass fibers and/or aramid fibers and/or carbon fibers and/or polybenzoxazole fibers and/or polyethylene fibers and/or nylon fibers, most preferably carbon fibers, and also one or more optical fibers, more preferably one or more fiber bundles O1, O2, O3, ON, in a polymer matrix material, for monitoring the condition of the rope. An optical fiber or fiber bundle O1, O2, O3, ON can be one continuous fiber or bundle disposed inside, or in the proximity of the surface of, the composite structure in the manufacturing phase such that the fiber goes inside the structure at a first end of the rope, turns back at the other end of the rope and comes out of the structure again at the first end of the rope. A fiber and/or a fiber bundle can be coiled, i.e. the fiber can have one or more turns inside, or on the surface of, the structure such that however only one fiber and/or fiber bundle is used for the measurement and the aforementioned fiber and/or fiber bundle can go into and come out of the same end or different ends of the rope. In this way one or more optical fibers and/or fiber bundles are integrated into the structure as sensor fibers and/or as reference fibers, the condition of which sensor fibers is monitored, e.g. by measuring the time-of-flight of a light pulse in the sensor fiber.

Also a number of parallel fibers or bundles can be used for measuring, in the manner according to the embodiment presented in FIG. 3. In FIG. 3 the width of the aforementioned load-bearing part P according to the invention is preferably greater than the thickness and the aforementioned load-bearing part P comprises one or more grooves G in the longitudinal direction of the rope on one or more of its wider sides, which aforementioned groove G divides the load-bearing part P into parts in the longitudinal direction of the rope, e.g. in the embodiment presented in FIG. 3 three grooves G in both the long sides of the essentially rectangular load-bearing part P symmetrically divide the cross-section of the load-bearing part P into four parts P1, P2, P3, PM of essentially equal size, which parts are solidly the same piece. The one or more parts P, P1, P2, P3, PM of the profile comprise an optical fiber or fiber bundle O1, O2, O3, ON, which optical fiber or fiber bundle preferably comprises at least a sensor fiber, preferably also a reference fiber. The reference fiber can also be installed inside the envelope such that strain caused by the structure to be measured is not exerted on it.

The condition of the roping is monitored by monitoring the condition of the parts $Pi, i=1, \ldots, M$, where M is the number of parts of the profile of the load-bearing part P divided by the grooves G, of the sensor fibers $Oj, j=1, \ldots, N$, where N is the number of sensor fibers, and if it is detected that a part of a sensor fiber has broken or the condition of it has fallen to below a certain predefined level, a need to replace or overhaul the rope or ropes is diagnosed and rope replacement work or rope maintenance work is started. The condition of the roping can also be monitored by measuring the time-of-flight of a light pulse in the sensor fibers $Oj, j=1, \ldots, N$, of the different parts $Pi, i=1, \ldots, M$, to compare the times-of-flight of the light pulses with each other and when the difference between the times-of-flight of the light pulses increases to above a predefined level, a need to replace or overhaul the rope or ropes is diagnosed and rope replacement work or rope maintenance work is started. The condition monitoring device can be arranged to initiate an alarm if the time-of-flight of the light pulse does not fall within the desired value range or differs sufficiently from the measured values of the time-of-flight of the light pulse for other ropes being measured. The time-of-flight of the light pulse changes when a property that depends on the condition of a load-bearing part of the rope, such as elongation or displacement, changes. For example, owing to breaks the time-of-flight of the light pulse changes, from which change it can be deduced that the load-bearing part is in bad condition.

Preferably the means for monitoring the condition of the roping 1, R comprises a condition monitoring device connected to the sensor fibers and to the reference fibers of the rope R, which device comprises means, such as a computer comprising a laser transmitter, receiver, timing discriminator, a circuit measuring a time interval, a programmable logic circuit and a processor. These means comprise one or more sensors, each of which sensors comprises e.g. reflectors, and a processor, which when they detect a change, e.g. in the time-of-flight of a light pulse in a sensor fiber, raise an alarm about excessive wear of the rope.

The property to be observed can also be e.g. a change in the amount of light traveling through the rope. In this case light is fed into an optical fiber with a laser transmitter or with a LED transmitter from one end and the passage of the light through the rope is assessed visually or by the aid of a photodiode at the other end of the fiber. The condition of the rope is assessed as having deteriorated when the amount of light traveling through the rope clearly decreases.

In one embodiment of the invention an optical fiber $Oj, j=1, \ldots, N$, functions as a Fabry-Pérot-type sensor. A Fabry-Pérot interferometer FPI comprises two reflective surfaces, or two parallel highly reflective dichroic mirrors, at the end of the fiber. When it hits the mirrors a part of the light passes through and a part is reflected back. After the mirror the light passing through travels e.g. through air, after which it is reflected back from the second mirror. Some of the light has traveled a longer distance in a different material, which has caused changes in the properties of the light. Elongation causes changes in e.g. the phase of the light. The light with changed properties interferes with the original light, after which the change is analyzed. After the lights have combined they end up in a receiver and in a signal-processing device. With the method the elongation of the fiber, and thus the condition of the rope, is assessed.

In one embodiment of the invention an optical fiber $Oj, j=1, \ldots, N$, comprising Bragg gratings is used, i.e. the so-called Fiber Bragg Grating FBG method is applied in the condition monitoring of the rope. Periodic grating structures are made in a single-mode fiber for the FBG sensor, which grating structures reflect a certain wavelength of the light corresponding to the grating back. When light is conducted into the fiber, the wavelength of the light corresponding to the grating is reflected back. When strain is exerted on the grating structure, the refractive index of the fiber changes. Changing of the refractive index affects the wavelength of the light being reflected back. By monitoring changes in wavelength, a change in the strain exerted on the grating can be ascertained, and thus also the condition of the rope. There can be many tens or hundreds of gratings by the side of the same fiber.

In one embodiment of the invention a distributed sensor fiber based on Brillouin spectrometry is used as an optical fiber $Oj, j=1, \ldots, N$. Ordinary single-mode fiber or multimode fiber can be used as a sensor. The optical fiber functions as a distributed sensor, which can function as a sensor that is hundreds of meters long, which measures throughout its length and corresponds if necessary to thousands of point-form sensors. Backscattering of light occurs continuously as the light propagates in the fiber. This can be utilized by monitoring the strength of certain backscattering wavelengths. Brillouin scattering arises in the manufacturing phase in non-homogeneous points created in the fiber. By observing the wavelengths of the original and the scattered light signal the elongation of the fiber, and thus the condition of the rope, is determined.

The effect of temperature on elongation measurements can be eliminated by, inter alia, using a reference fiber as an aid, which reference fiber is installed such that strain caused by the structure to be measured is not exerted on it.

Structurally the aforementioned load-bearing composite part P is preferably a composite structure, preferably a non-metallic composite structure, which comprises reinforcing fibers in a polymer matrix material. The reinforcing fibers are essentially evenly distributed in the matrix material, which surrounds the individual reinforcing fibers and which is fixed to them. The matrix material fills the areas between individual reinforcing fibers and binds essentially all the reinforcing fibers that are inside the matrix material to each other as an unbroken solid binder agent. In this case abrasive movement between the reinforcing fibers and movement between the reinforcing fibers and the matrix material is prevented. A chemical bond exists between, preferably all, the individual reinforcing fibers and the matrix material, one advantage of which is cohesion of the structure. For reinforcing the chemical bond, a sizing obtained as a result of the surface treatment of the reinforcing fibers can be between the reinforcing fibers and the matrix material, in which case the aforementioned bond to the fiber is formed via the sizing in question.

Since the reinforcing fibers are in the polymer matrix material, it means that the individual reinforcing fibers and possible optical fibers are bound in the manufacturing phase to each other with the matrix material, e.g. with resin. With the method according to the invention, in pultrusion reinforcements wetted with resin or prepreg reinforcements are pulled through a heated nozzle acting as a mould, in which the piece receives its shape and the resin hardens. In this case in between the individual reinforcing fibers that are bound to each other is resin. According to the invention, therefore, a large amount of reinforcing fibers in the longitudinal direction of the rope that are bound to each other are distributed in the matrix material, being also evenly distributed in the load-bearing part P. The reinforcing fibers are preferably distributed essentially evenly in the matrix material such that the load-bearing part P is as homogeneous as possible when viewed in the direction of the cross-section of the rope. In this way the reinforcement density does not vary greatly in the load-bearing part P. The reinforcing fibers and possible optical fibers together with the matrix material form an unbroken load-bearing part P, inside which large shape deformations do not occur when the rope is bent. The individual fibers of the load-bearing part P are mainly surrounded with matrix material, but contacts between fibers can occur in places, e.g. because of pores in the matrix material. If, however, it is desired to reduce the random occurrence of contact between fibers, the individual fibers can be surface treated before the binding of individual fibers to each other. In the invention the individual fibers of the load-bearing part can comprise the material of the matrix material around them such that the matrix material is immediately against the fiber, but the thin surface treatment material of the fiber, e.g. a primer arranged on the surface of the fiber in the manufacturing phase to improve chemical adhesion to the matrix material, can be in between. The matrix material can comprise a basic polymer and, as a supplement, additives for optimizing the properties of, or for hardening, the matrix material. The matrix material is preferably a non-elastomer. The most preferred matrix materials are epoxy resin, polyester resin, phenolic resin or vinyl ester. The modulus of elasticity E of the matrix material is preferably over 1.5 GPa, more preferably over 2 GPa, even more preferably in the range 2-10 GPa, most preferably of all in the range 2.5-4 GPa.

Preferably the aforementioned reinforcing fibers are non-metallic fibers, which have a high specific stiffness, i.e. ratio of the modulus of elasticity to density, and specific strength, i.e. ratio of strength to density. Preferably the specific strength of the reinforcing fibers of the load-bearing part of the rope in tension is over 500 (MPa/g/cm$^3$) and the specific stiffness over 20 (GPa/g/cm$^3$). Preferably the aforementioned reinforcing fibers are carbon fibers, glass fibers, aramid fibers or polymer fibers, e.g. polyethylene fibers, such as UHMWPE fibers, polybenzoxazole fibers or nylon fibers, which are all more lightweight than metal reinforcements. The reinforcing fibers of the load-bearing part P can comprise one of these, e.g. just carbon fibers, or can be a combination of these fibers, e.g. carbon fibers and polybenzoxazole fibers, or can comprise at least one of these fibers. Most preferably the aforementioned reinforcing fibers are carbon fibers or polybenzoxazole fibers, which have a good specific stiffness and specific strength in tension and at the same time withstand very high temperatures. This is important in elevators because poor heat tolerance of the hoisting ropes might cause damage or even ignition of the hoisting ropes, which is a safety risk. Good thermal conductivity also improves the onward transfer of friction heat and thus reduces the accumulation of heat in the parts of the rope.

The width of the rope is thus essentially greater than the thickness. In addition the rope preferably, but not necessarily, possesses at least one, preferably two, wide and essentially flat surfaces, in which case a wide surface can be efficiently used as a force-transmitting surface utilizing friction or positive contact, because in this way an extensive contact surface is achieved. The wide surface does not need to be completely flat, but instead there can be grooves in it or protrusions on it, or it can have a curved shape. The structure of the rope continues preferably essentially the same for the whole distance of the rope. The cross-section can also, if so desired, be arranged to change intermittently, e.g. as toothing.

The hoisting roping can be different in its cross-section and/or in its material to the suspension roping. The structure of the ropes of the hoisting roping can in this case be optimized e.g. from the viewpoint of transmitting tension, e.g. friction or positive locking, whereas the structure of the ropes of the suspension roping can be optimized from the viewpoint of the tensile strength and rigidity and lightweightness of the rope.

It is obvious to the person skilled in the art that in developing the technology the basic concept of the invention can be implemented in many different ways. The invention and the embodiments of it are not therefore limited to the examples described above, but instead they may be varied within the scope of the claims.

The invention claimed is:

1. A rope of a lifting device for an elevator, the rope comprising:
    a load-bearing part, the load-bearing part having an essentially rectangular cross-section where a width of the cross-section is greater than a height of the cross-section, the load-bearing part including glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material, and both upper and lower, long sides of the width of the cross-section of the load-bearing part include symmetrically or asymmetrically one or more grooves, which one or more grooves extend a length of the load-bearing part in a longitudinal direction to divide the load-bearing part into smaller parts; and
    a coating material coating the load-bearing part, the coating material filling the one or more grooves, and the coating material being a polymer,
    wherein the fiber reinforcements are interspersed throughout the load-bearing part such that the fiber reinforcements are provided between a narrowest point of the load-bearing part between opposed grooves.

2. The rope according to claim 1, wherein the load-bearing part includes one or more optical fibers disposed inside, or in a proximity of a surface of, the load-bearing part.

3. The rope according to claim 2, wherein the one or more optical fibers extends through opposite ends of the rope inside the load-bearing part.

4. The rope according to claim 2, wherein the one or more optical fibers includes a Fabry-Pérot-type sensor fiber for condition monitoring of the rope.

5. The rope according to claim 2, wherein the one or more optical fibers include a sensor fiber comprising a Bragg grating structure for condition monitoring of the rope.

6. The rope according to claim 2, wherein the one or more optical fibers include a sensor fiber which functions as a Brillouin distributed fiber sensor for condition monitoring of the rope.

7. The rope according to claim 2, wherein the one or more optical fibers include a sensor fiber, in which fiber a time-of-flight of a light pulse is measured for condition monitoring of the rope.

8. The rope according to claim 1, wherein a depth in a height direction of the cross-section of the one or more grooves made in both long sides of the cross-section of the load-bearing part is 0.5-2 mm,
wherein each groove is V-groove shaped, and
wherein a V-angle of the groove is 15-40 degrees.

9. The rope according to claim 1, wherein the polymer is an elastomer.

10. A rope of a lifting device for an elevator, the rope comprising:
a load-bearing part, the load-bearing part having an essentially rectangular cross-section where a width of the cross-section is greater than a height of the cross-section, the load-bearing part including glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material, and one or more long sides of the cross-section of the load-bearing part includes symmetrically or asymmetrically one or more grooves, which one or more grooves extend a length of the load-bearing part in a longitudinal direction to divide the load-bearing part into smaller parts; and
a coating material coating the load-bearing part, the coating material filling the one or more grooves, and the coating material being a polymer,
wherein the load-bearing part is configured to split in a controlled manner at one or more of the grooves into smaller load-bearing parts when supporting an elevator car, the coating material keeping the rope together and an amount of the load-bearing cross-section does not essentially change.

11. An elevator comprising an elevator car, a counterweight, roping, which connects the elevator car and counterweight to each other, and means for moving the roping, wherein the roping includes a rope according to claim 1, and the elevator car is arranged to be moved by aid of the rope.

12. The elevator according to claim 11, wherein the means for moving the aforementioned roping includes a hoisting machine.

13. The elevator according to claim 11, wherein the load-bearing part of the rope includes one or more optical fibers, and
wherein the elevator includes means for monitoring a condition of the rope by monitoring a condition of the one or more optical fibers by measuring a time-of-flight of a light pulse and/or elongation and/or displacement of the one or more optical fibers.

14. A method for manufacturing a rope of a lifting device for an elevator, the rope includes a load-bearing part, the load bearing part having an essentially rectangular cross-section wherein a width of the cross-section is greater than a height of the cross-section, the load-bearing part includes glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material, the method including:
providing one or more grooves, symmetrically or asymmetrically, on both upper and lower, long sides of the width of the cross-section of the load-bearing part, the one or more grooves extending a length of the rope in a longitudinal direction and dividing the load-bearing part into smaller parts; and
coating the load-bearing part with a coating material so as to fill the one or more grooves, the coating material being a polymer,
wherein the fiber reinforcements are interspersed throughout the load-bearing part such that the fiber reinforcements are provided between a narrowest point of the load-bearing part between opposed grooves.

15. The method according to claim 14, further comprises disposing one or more optical fibers inside, or in a proximity of a surface of, the load-bearing part in order to monitor a condition of the rope.

16. The method according to claim 15, wherein the one or more optical fibers includes a Fabry-Pérot-type sensor fiber to monitor the condition of the rope.

17. The method according to claim 15, wherein the one or more optical fibers includes a sensor fiber comprising a Bragg grating structure to monitor the condition of the rope.

18. The method according to claim 15, wherein the one or more optical fiber includes a sensor fiber that functions as a Brillouin distributed fiber sensor to monitor the condition of the rope.

19. The method according to claim 15, wherein the aforementioned optical fiber and/or fiber bundle comprises a sensor fiber, in which fiber the time-of-flight of a light pulse is measured for the condition monitoring of the rope.

20. The method according to claim 15, wherein the method comprises the following phases:
the load-bearing part of the rope is manufactured with pultrusion technology by pulling the reinforcing fibers and the one or more optical fibers in the polymer matrix material through a profile tool,
in the pultrusion, grooves are formed on the long sides of the cross-section of the load-bearing part of the rope in the longitudinal direction of the rope,
the rope is cut to length and the rope is reeled onto a reel,
the rope is installed in the elevator in an operating location, and
the load-bearing part of the rope is split at the grooves into a plurality of load-bearing parts by loading the rope in the elevator in the operating location.

21. The method according to claim 14, wherein a depth in a height direction of the cross-section of the one or more grooves is 0.5-2 mm,
wherein each groove is V-groove shaped, and
wherein a V-angle of each groove is 15-40 degrees.

22. The method according to claim 14, wherein the coating material is an elastomer.

* * * * *